United States Patent [19]

Carnel

[11] 4,378,533

[45] Mar. 29, 1983

[54] MODULATOR FOR INJECTING SIGNALS INTO A POLYPHASE POWER TRANSMISSION SYSTEM

[75] Inventor: Alain Carnel, Poitiers, France

[73] Assignee: Enertec SA, Montrouge, France

[21] Appl. No.: 197,048

[22] Filed: Oct. 15, 1980

[30] Foreign Application Priority Data

Oct. 17, 1979 [FR] France ............................. 79 25785

[51] Int. Cl.³ ..................... H02M 5/45; H02M 7/515
[52] U.S. Cl. .............................. 332/9 R; 340/310 R; 363/37
[58] Field of Search ................ 332/9 R, 9 T; 363/37, 363/71, 138; 455/103; 340/310 R

[56] References Cited

U.S. PATENT DOCUMENTS

3,825,813  7/1974  Wirtz ................................. 363/138
3,866,098  2/1975  Weiser .

FOREIGN PATENT DOCUMENTS

1113013  5/1968  United Kingdom .

OTHER PUBLICATIONS

J. C. Vander Meer, "Component Selection for Solid State Crane Drives", IEEE Conference Paper No. 71 CP 722; Aug. 24, 1971, 5 pp.

Primary Examiner—Siegfried H. Grimm
Assistant Examiner—Edwared P. Westin
Attorney, Agent, or Firm—Dale Gaudier

[57] ABSTRACT

A modulator for injecting signals into a polyphase power transmission system includes a bridge of four thyristors for each phase. The thyristors of each bridge are connected so that when the thyristors of two opposite arms are ignited simultaneously they produce a signal at the output from the modulator of opposite sense to the corresponding signal when the thyristors of the two other opposite arms are ignited. The thyristors of the adjacent arms are controlled in opposition and coupled by an induction coil having two windings which, through the back EMF generated by mutual inductance, causes the extinction of one of them when the other is ignited. The energy stored in the induction coil at the time of the extinction phase is dissipated as heat in a resistor provided for this purpose in a loop which does not contain the supply.

3 Claims, 6 Drawing Figures

MODULATOR FOR INJECTING SIGNALS INTO A POLYPHASE POWER TRANSMISSION SYSTEM

The present invention relates to modulators, in particular to modulators employed in static generators with a view to injecting into an electric power line heavy current signals towards consumer stations connected to the line.

It is well known that modulators of electric current are devices which enable there to be created from control signals of relatively weak power, transmitted under conditions of defined modulation, corresponding heavy-current signals, which in particular are capable of traversing great distances along electric power lines.

One example of application of these modulators is found in static generators for centralized telecommunication, in which trains of waves of an acoustic frequency of 175 HZ, for example, are sent over the electric power network in order to control certain operations in receiver stations on the consumer's premises, such as the switching-on and switching-off of waterheaters, changes of meter tariffs, etc. The trains of waves at 175 HZ are modulated in amplitude and in duration and position in time, so that the receivers after detection of a first train called the starting pulse, can recognize in the succeeding train or trains of waves or pulses a coded message which often contains an address or a preselection.

One known type of modulator includes a d.c. power supply and two controlled rectifiers such as thyristors commutated alternately so as to cause a direct current from this supply to pass alternately in one direction and the other through the primary of an output transformer the secondary of which thus receives a periodic voltage.

These simple systems lend themselves with difficulty to regulation of the output voltage as a function of the load into which the modulator is discharging.

Modulators are likewise known into which the flow of current towards the output circuit in each direction is controlled not by one but by two thyristors placed in series. In this type of system four thyristors per phase are connected in a bridge and it is possible by acting upon the individual controls of each thyristor to make the output voltage from the bridge adopt three states, positive, negative and zero, which enables the width of the positive and negative pulses of this voltage waveform to be modulated and hence its mean value without modifying either the symmetry of these pulses or their frequency or their phase with respect to a phase reference voltage or pilot signal.

A general problem persists, however, with these systems, which is connected with the employment of controlled rectifiers and especially of thyristors. In short, once ignited, that is to say, brought to a conductive state, a controlled rectifier is difficult to extinguish. The disappearance of the control signal which has caused its ignition is not sufficient and a powerful polarization in the reverse sense is necessary in order to bring about its rapid extinction.

Various systems have been proposed for bringing about this extinction or turned-off of the controlled rectifier by reverse polarization. In particular, systems have been proposed having a thyristor bridge in which the two adjacent thyristors controlled in opposition in each half-bridge are connected by an induction coil having two windings so that the ignition of one causes the extinction of the other by mutual effect. These devices, however, present a problem of elimination of the energy accumulated in the induction coil during the phase of extinction, which energy must be eliminated as rapidly as possible in order to enable the next extinction in cases of rapid commutation sequences.

Circuits for elimination of this energy have been proposed in which an auto-transformer coupled to diode circuits enable the return towards the d.c. supply of the energy trapped in the induction coil in accordance with a principle known as the recovery principle. This operation is effected rapidly and without disturbing the operation of the thyristor which has become conductive. But it displays the disadvantage of making use of components (auto-transformers) which are expensive and bulky, taking into account the magnitude of the currents which have to be conveyed in order to eliminate the energy in question. Other systems call upon supplementary thyristors for controlling the turn-off phase proper, which is likewise a factor of additional cost.

The present invention aims to reduce certain disadvantages pointed out previously, and proposes a modulator which enables powerful signals to be produced at high frequencies thanks to rapid commutation sequences of heavy currents with a set of components reasonable in price.

For this purpose, the object of the invention is in particular a modulator for the production of a periodic output signal under the control of a pilot signal with a view to the injection of the output signal into an electric power line, including:

a d.c. supply;

output means for delivering an output signal;

at least a first and a second controlled rectifier suitable for being controlled so that when one of them is subjected to a control signal to make it conductive the other is not;

each of these controlled rectifiers being capable in the conductive state of connecting the d.c. supply to the output means so that an output signal can be produced in these output means, having one polarity when the first controlled rectifier is conductive and an opposite polarity when the second controlled rectifier is conductive;

means accumulative of electrical energy connected to each of the first and second controlled rectifiers in order at the time of making the second controlled rectifier conductive to cause the application of a reverse polarization voltage to the terminals of the first controlled rectifier in order to ensure the extinction of the said first controlled rectifier, with storage of energy in these accumulative means; and resistive means associated with the second controlled rectifier and connected in order to receive a current under the action of these means accumulative of energy in order to ensure the thermal dissipation of the energy stored in the said accumulative means in connection with the extinction of the first controlled rectifier without sensible return of this energy to the said supply.

Thanks to this system one succeeds in eliminating very rapidly the energy trapped by the single set of thyristors existing in the modulator and without necessitating either the intervention of other components of high cost or prohibitive over-dimensioning of the useful components.

Other aspects and advantages of the invention will become apparent from reading the following description of an embodiment of the invention, which is given with reference to the attached drawings in which:

FIG. 3, formed by the FIGS. 3A, 3B, 3C and 3D, illustrates the different examples of conduction of the thyristors of one bridge of the circuit of FIG. 1;

Figure 1:
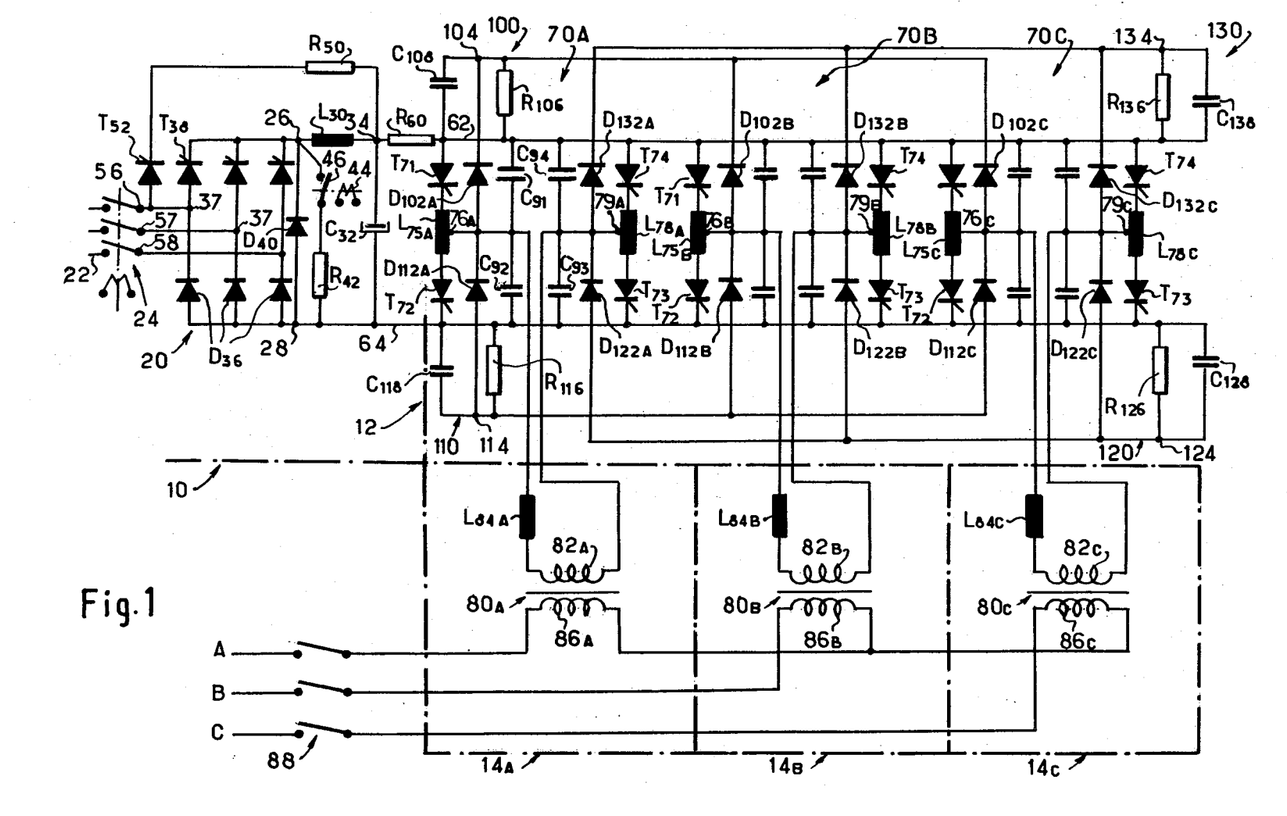
FIG. 1 is a diagram of the electrical circuit of a modulator in accordance with the invention.

Referring to FIG. 1, a modulator diagram is shown, which includes three main portions:

a d.c. voltage supply 10 which supplies, for example, a voltage of 500 volts d.c. from a three-phase network of 380 volts;

a modulation circuit 12 which includes three thyristor bridges, each corresponding with one phase of a three-phase network;

three output circuits 14A, 14B and 14C for the three respective phases of an output network.

The supply 10 includes a three-phase rectifier bridge 20 connected directly to the terminals of an input three-phase network 22 of 380 volts, by way of a contactor 24. To the output terminals 26 and 28 of the rectifier 20 is connected a filter which comprises an induction coil L30 and an electrolytic capacitor C32 connected in series between these terminals 26 and 28. The output from the filter (L30, C32) is effected between the terminal 28 and a terminal 34 at the junction between the induction coil L30 and the capacitor C32. By convention the terminal 28 will be referred to as the negative terminal and the terminal 34 as the positive terminal of the d.c. supply provided at the output from this filter.

The three-phase rectifier 20 is composed of three arms mounted in parallel between the terminals 26 and 28. Each of these arms includes a diode D36 and a thyristor T38, conductive in the sense of the terminals 28 to 26 and joined by a junction point 37 connected to one terminal respectively 56, 57 or 58 of the contactor 24. In addition, a diode D40 connects the terminals 28 to 26 in this conductive sense.

A resistor R42 is provided in parallel with the diode D40 in order to shunt it and the filter when a relay 44 is de-excited in order to close a contact 46 which discharges the capacitor C32.

A precharging resistor R50 is in addition mounted between the terminal 34 and the cathode of a thyristor T52, the anode of which is connected to the terminal 56 of the contactor 24. This resistor, when the gate of the thyristor T52 is excited prior to the putting of the supply 20 under voltage by the contactor 24, enables the capacitor C32 to be precharged to a voltage which is damped with respect to the voltage which would be supplied by the induction coil L30 in the absence of such a precharging circuit.

An input resistor R60 is connected between the terminal 34 and a line 62 at its output, the line 62 and the line 64 connected to the terminal 28 forming the inputs proper to the modulation circuit 12.

The modulation circuit 12 consists of three identical thyristor bridges 70A, 70B, 70C which are associated respectively with the output circuits 14A, 14B, 14C. Each of these output circuits is used to inject the signals produced by the modulator into a respective phase of the network.

The output circuit 14A includes a transformer 80A the primary 82A of which is connected in series with an induction coil 84A for smoothing the voltage applied to the transformer. The output circuits 14B and 14C consist in the same way of transformers and induction coils having the same numbers but having indices A, B or C corresponding with the phase with which they are associated.

The secondaries 86A, 86B and 86C of the output transformers 80A, 80B, 80C are connected in a wye configuration and connected by a contactor 88 to the lines of phases A, B and C of a circuit for injecting the output of the modulator into the network (not shown). This injection into the electric power transmission network proper is carried out by an injection transformer through a resonant shunt which prevents reverse flow of the normal frequency of the network (50 or 60 HZ) towards the output circuits 14A, B and C.

Returning to the modulation circuit 12 there will now be described in detail the thyristor bridge 70A associated with the output circuit 14A, the bridges 70B, 70C being identical and their like components being referenced by the same reference numbers associated for certain of them with letter indices corresponding with the bridge of which they form part.

The thyristor bridge 70A includes two half-bridges in parallel between the inputs 62 and 64. The first half-bridge consists of two thyristors in series and aligned in the same direction, T71 and T72, the anode of T71 being coupled to the positive input 62 whilst the cathode of the thyristor T72 is coupled to the negative input 64. The cathode of T71 is connected to the anode of T72 by way of an inductance (or induction coil) L75A having a centrepoint 76A.

The second half-bridge of the bridge 70A is composed of two thyristors in series, and aligned in the same direction T74 and T73 between the inputs 62 and 64 and connected by an inductance (or induction coil) L78A having a centrepoint 79A, the cathode of T74 being connected to the anode of T73 thorugh the inductance L78A.

The thyristors T71, T72, T73 and T74 form a bridge between the inputs 62 and 64 and the output terminals on its diagonal, represented by the centrepoints 76A and 79A of the induction coils L75A and L78A between which are connected the induction coil L84A and the winding 82A of the output circuit 14A.

Between the input 62 and the centrepoint 76A is connected a capacitor C91 and between the centrepoint 76A and the negative input 64 is connected a capacitor C92. Similarly, capacitors C94 and C93 are respectively connected between the positive input 62 and the centrepoint 79A, on the one hand, and the centrepoint 79A and the negative input 64 on the other.

Between the positive input 62 and the centrepoint 76A there is likewise connected a circuit 100 for dissipating of the energy stored in the induction coil L75A when the thyristor T71 becomes conductive as will be explained later. This circuit includes a diode D102A the anode of which is connected to the centrepoint 76A and the cathode of which is connected to a junction point 104. Between this junction 104 and the input 62 are connected in parallel a resistor R106 and a capacitor C108.

In the same way a dissipation circuit 110, associated with the thyristor T72 includes a diode D112A, the cathode of which is connected to the centrepoint 76A and the anode to a junction point 114. Between this junction 114 and the negative input 64 are connected in parallel a resistor R116 and a capacitor C118.

Two dissipation circuits 120 and 130 are respectively associated with the thyristors T73 and T74. They include respectively diodes D122A and D132A as well as resistors R126 and R136, capacitors C128 and C138 and junction points 124 and 134. These components are connected to the circuit 120 in a manner which is identical with that of the members of the circuit 110 if the centrepoint 76A is replaced by the centrepoint 79A and for the circuit 130 in a manner identical with that of the members of the circuit 100 by making the same replacement.

The circuits 100, 110, 120 and 130 are likewise associated respectively with the thyristors of the bridges 70B and 70C of the same reference number as the thyristors with which they are associated in the bridge 70A.

For this purpose, the junction point 104 of the dissipation circuit 100 is likewise connected to the centrepoint 76B of the induction coil L75B of the bridge 70B by way of a diode D102B and to the centrepoint 76C of the induction coil L75C of the bridge 70C by way of a diode D102C.

Similarly the junction point 114 of the circuit 110 is connected to the centrepoints 76B and 76C of the bridges 70B and 70C by diodes D112B and D112C. In addition, the junction points 124 and 134 are connected to the centrepoints 79B and 79C of the induction coils L78B and L78C by the respective diodes D122B and D122C for the circuit 120 and by the respective diodes D132B and D132C for the circuit 130.

Hence it is seen that the parallel RC portions of circuit of the dissipation circuits 100, 110, 120 and 130 are common to the three thyristor bridges 70A, 70B, 70C.

Figure 2:
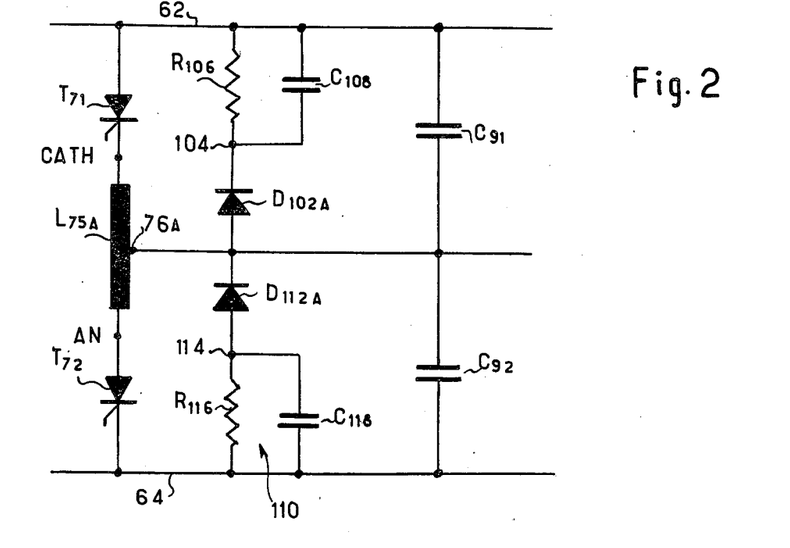
FIG. 2 is an enlarged view of a portion of the circuit as FIG. 1.
Figures 3, 3A:
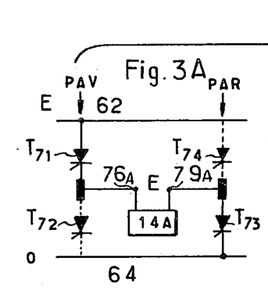
Figure 4:
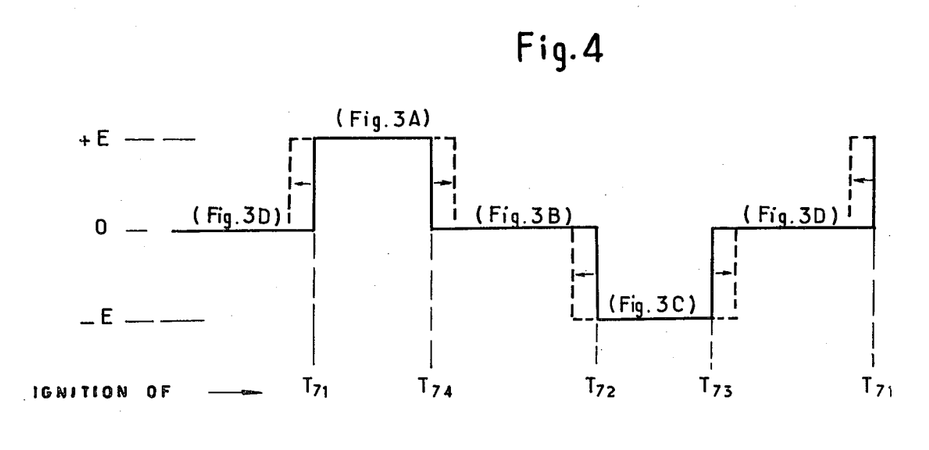
FIG. 4 illustrates the formation of the output signal corresponding with one sequence of the examples of FIG. 3.

The general operation of the circuit is first of all made clear with reference to FIGS. 3 and 4 in order to describe the principles of formation of the output signals. Then the detail of the operation of the thyristor bridges which carry out the necessary commutations is discussed in greater detail with respect to FIGS. 2, 5 and 6.

The control system (not shown) of the thyristors T71, T72, T73 and T74 of each bridge is such that in normal operation the pairs of thyristors in line such as T71, T72 and T73, T74 of each half-bridge are controlled in opposition. That means that when an ignition or turn-on control signal is applied to the gate of T71, no ignition control signal is applied to the control grid of T72 and vice versa.

In FIGS. 3A to 3D the portions of circuit in a conductive state have been represented in solid line while the non-conductive portions of circuit are represented in dotted lines.

It may be seen that depending upon the states of the thyristors T71 and T74 of the bridge 70A being conductive or not, or as it is often expressed, ignited or extinct, four combinations are possible (the supply voltage between 62 and 64 has been designated by E). In the first combination, shown diagrammatically in FIG. 3A, T71 and T73 are conductive (thyristors in opposite arms of the bridge) and an electromotive force (e.m.f.) +E in one sense appears between the centrepoints 76A and 79A, that is to say, at the terminals of the output circuit 14A.

Figures 3, 3B:
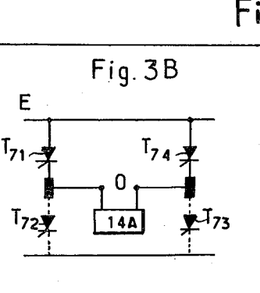
Figures 3, 3C:
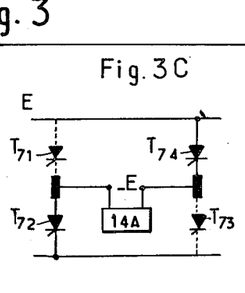

FIG. 3C represents the converse situation in which the thyristors T71 and T73 are extinct whilst the thyristors T72 and T74 are ignited, an e.m.f. −E appearing at the terminals 76A and 79A in the opposite sense to the previous one.

Figures 3, 3D:
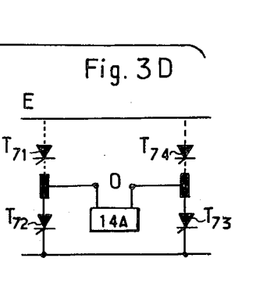

FIG. 3B represents the case in which the thyristors T72 and T73 are extinct and the thyristors T71 and T74 are ignited, and FIG. 3D represents the converse situation. In the two cases no voltage appears between the centrepoints 76A and 79A; the output circuit is subjected to a zero e.m.f.

In FIG. 4 is represented a wave shape of voltage against time, which is obtained at the terminals 76A and 79A of the output circuit 14A by successive commutations of the thyristors T71 to T74, the corresponding configuration of FIG. 3 being indicated opposite each flat portion of the wave. Thus, for example, the peak of the pulse at the level +E corresponds with the arrangement as FIG. 3A. Starting from this configuration, the excitation of the thyristor T74 causes the extinction of the thyristor T73 and the falling of the output e.m.f. back to the level O in the situation represented by FIG. 3B (zero output level).

Starting from this state, the conduction of the thyristor T72, accompanied by the extinction of T71, will cause the appearance of an output e.m.f. of −E (FIG. 3C). Then the making conductive of the thyristor T71 will bring the output e.m.f. back to the level O again (FIG. 3D). It may be seen from FIG. 4 that by acting upon the separation between the command times of making conductive the thyristors T71 to T74, the widths of the positive and negative voltage pulses at the output from the bridge may be made to vary (crenelations in dotted lines in FIG. 4). This phenomenon is made use of by the control circuit of the modulator.

Figure 5:
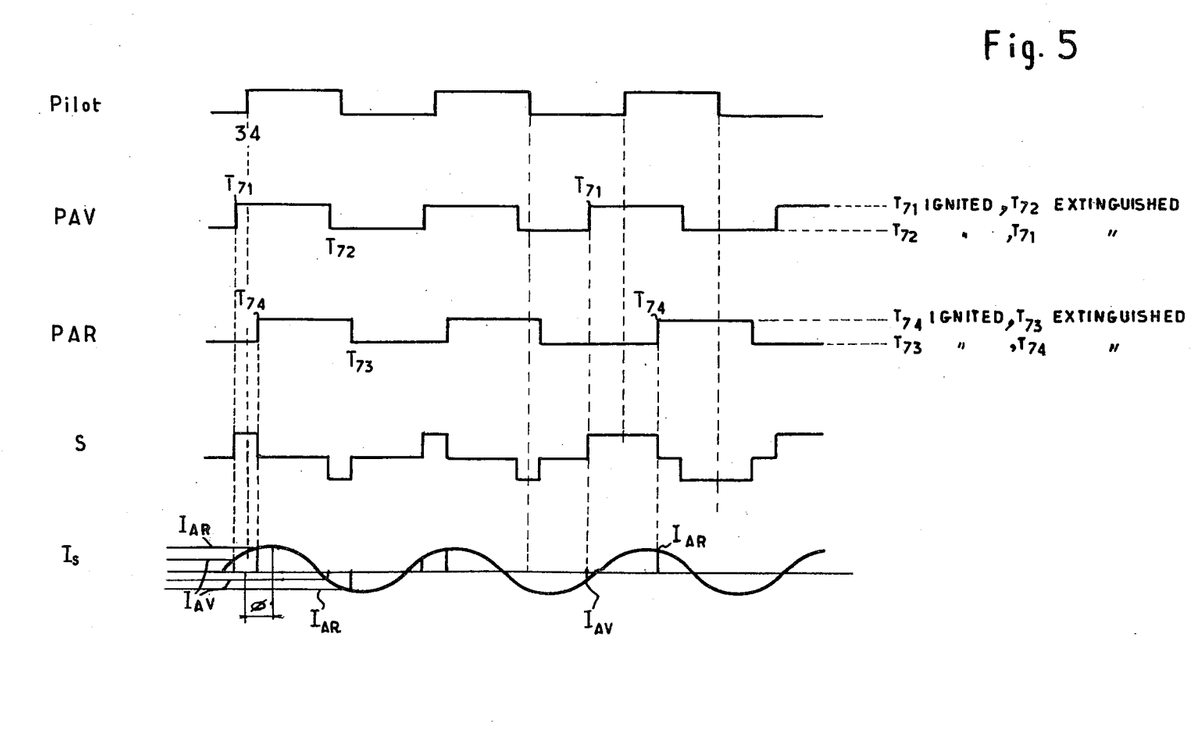
FIG. 5 is a graph of the control signals of the thyristors and of the output voltage and current resulting from them.

FIG. 5 represents the graph of the output voltage state signals from the half-bridge PAV formed by the thyristors T71 and T72 and from the half-bridge PAR formed by the thyristors T73 and T74.

In FIG. 5 the transition from low to high of the signals output from half-bridges PAV and PAR corresponds with an ignition command to the thyristors T71 and T74 respectively. The transition from high to low corresponds with an ignition command to the thyristors T72 and T73.

It may be seen that the ignition commands to the respective thyristors of the half-bridges, while having the same frequency, are shifted in phase. The output e.m.f. at the terminals of the circuit 14A resulting from the difference in the output voltages of PAV and PAR is represented at S in FIG. 5.

In FIG. 5 the "pilot" signal is likewise represented, which provides the reference frequency of the output signal S. It may be seen that the width of the positive and negative pulses of the signal S is determined by the phase shift in the signals PAV and PAR. This modulation of width occurs, however, without change of frequency and without destroying the symmetry in the width of the positive and negative pulses in the output voltage with respect to the pilot signal.

It may likewise be observed that the zero output e.m.f. level is obtained when the thyristors of the bridge 70A are controlled with zero phase shift between the opposite half-bridges and the output e.m.f. may be modulated by increasing this phase shift.

As far as the operation of each bridge proper is now concerned, in particular the cycle of extinction of the thyristors in one half-arm of a bridge, reference may be made to FIG. 2 which represents an enlarged view of the components of the lefthand half of the bridge 70A in FIG. 1.

All of the components keep the same reference number, only the arrangement relative to certain of these components having been slightly modified in order to facilitate understanding it.

If the situation is examined in which the thyristors T71 and T73 are conductive it may be seen as has already been seen with respect to FIG. 3A that a current flows between the positive input 62 and negative input 64 through the thyristor T71, the output circuit 14A and the thyristor T73. The notation E is kept for the value of the voltage at the input terminal 62, assuming the voltage of the input terminal 64 to be zero.

In order to cause commutation of the thyristor T72 into conduction, a signal is applied to the gate of the latter while the gate of the thyristor T71 is without such signal.

When the thyristor T72 ignites, the connection between the centrepoint 76A of the induction coil L75A and the input terminal 64 becomes conductive. The current through the thyristor T72 passes abruptly from the value 0 to the value $I_{ch}$ as is shown in the graph in FIG. 6. The anode voltage of T72 which was practically at the level E falls abruptly to a value close to 0.

The voltage of the centrepoint 76A was also practically equal to E before the ignition of T72. Thus a voltage difference E appears abruptly at the terminals of the lower winding of the induction coil L75A (connected to the anode AN of T72), which by the mutual induction between the lower and upper windings of the induction coil L75A is expressed by the creation of an equal voltage difference at the terminals of the upper half of this induction coil and the appearance of a voltage 2E at the cathode of T71 (CATH).

It may be seen that the thyristor T71 thus becomes polarized in reverse by mutual effect with a voltage (−E) between its anode (at the voltage E) and its cathode (at the voltage 2E). This inversion of voltage causes the cutting off (extinction) of the thyristor T71.

Figure 6:
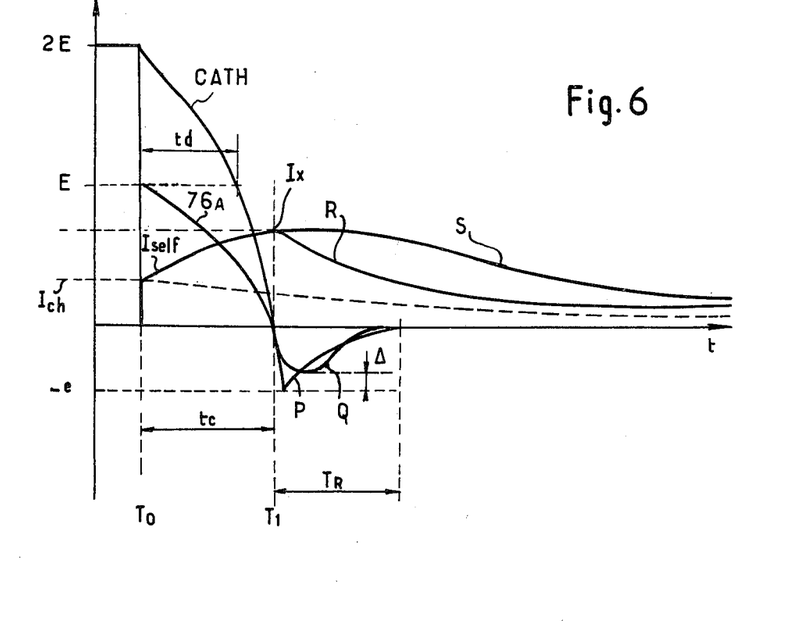
FIG. 6 is a graph of voltages and currents illustrating the operation of the modulator in accordance with the invention.

The development of the voltages at the cathode of T71 on the one hand and at the centrepoint 76A of the induction coil on the other hand, from the instant of ignition To is represented on the graph in FIG. 6. The voltage at the point 76A decreases from the value E (the curve PM76A). The voltage at the cathode of T71 (the top end of the induction coil L75) decreases simultaneously from the value 2E. During the interval of time td during the course of which the voltage of the cathode CATH of T71 decreases as far as the value E, the thyristor remains polarized in the reverse sense and and the circuits, in particular the induction coil L75A, are dimensioned so that the time td is greater than the time tq which is necessary for the complete extinction of the thyristor T71.

At the time To the capacitor C91 is discharged with the voltage E at each of its terminals. On the otherhand the capacitor C92 subjected to the voltage E between the centrepoint 76A and the input 64 is charged. As soon as T72 is conductive and T71 is extinct, the capacitor C91 charges up while the capacitor C92 is discharged through the point 76A, the corresponding currents adding together in order to supply in particular the increase in the current passing through the lower winding of the induction coil L75A and the thyristor T72 along a curve represented in FIG. 6 (Iself). This increase in current is due to the voltage at the terminals of this lower winding.

When the capacitor C92 is discharged the voltage at the point 76A tends to become negative and the diode D112A starts to conduct. Simultaneously the current Iself passes through a maximum Ix and starts to decrease.

This current Ix corresponds with the manifestation of an energy, $\frac{1}{2}LIx^2$, stored in the induction coil L75A at the instant $T_1$ of the annulment of its voltage at the terminals during the commutation phase (the interval to between the times To and $T_1$).

It is necessary to eliminate this trapped energy with the least delay if it is desired to avoid a certain number of disadvantages.

That is, it may be seen in particular from the curve S in FIG. 6 that the current Ix becomes added to the charging current $I_{ch}$ passing through the thyristor T72, which introduces a risk of increasing accordingly the total current to be cut off when it is desired to extinguish this thyristor rapidly again.

For lack of any special precaution a higher commutation power is then necessary, which can be supplied only by a larger induction coil for the commutation, which in turn increases the amount of energy trapped by the operation of commutation itself. Hence there is a risk of having to overdimension the thyristors with respect to what is needed for the useful current alone.

In the absence of the circuit R116, C118, the energy trapped in the induction coil L75 would take a relatively long time to be dissipated in the loop formed by the diode D112A, the lower winding of L75A and the thyristor T72, only the voltage drop, for example, of about 3 volts, created by the inherent resistance of the thyristor T72 then intervening in a significant manner to attenuate the current Ix. Under these conditions rapid commutation is difficult to obtain and can be effected only at the price of dangerous heating of the thyristors or of overdimensioning them.

Various solutions making use of complicated systems and components of high cost have been envisaged in the past in order to eliminate this problem of overcurrent (recovery phase) which made use of autotransformers or supplementary turn-off thyristors, or necessitated costly overdimensioning of certain components.

In the embodiment described, provision has been made for eliminating the energy trapped in the commutation inductance by thermal dissipation in a resistor such as R116. That is, it was possible to observe that it was possible at relatively little expense to employ such a resistor R116 of sufficiently large dimensions for obtaining rapid dissipation without this component being subjected to too high stresses. Thus with a resistor R116 creating a drop in voltage of about 60 volts in the loop at the start of the phase of dissipation of trapped energy, one succeeds in dividing by twenty (20) the time of dissipation of this energy with respect to the case in which only the internal resistance of the thyristor T72 intervenes for this purpose. Such a result may be obtained with a resistor of the order, for example, of a fraction of an ohm for a thyristor rated for voltages of about 1000 volts and currents of 100 amperes.

While the temperature of the casing of such a thyristor could not without danger exceed 80°–90° C., experience has shown that it was quite possible to operate with resistors R116 brought to temperatures of more than 400° C. the cooling of which is ensured by natural convection alone round the component without having recourse to complicated devices with radiators such as power thyristors are equipped with, which are employed in the technique being considered.

FIG. 6 illustrates at S the variation in the current in the thyristor T72 in the absence of the resistor R116 while the curve R represents this same current in the presence of this resistor and the corresponding time of recovery TR.

It must be observed that the problem of dissipation of energy trapped on the occasion of the turning-off of a thyristor is a general problem which is solved in various ways in prior art, some of which cause to occur in a more or less inevitable fashion during the course of the recovery phase the dissipation by thermal means of a portion of this trapped energy. However, in these systems the essential principle put into effect during the course of the recovery phase is the restoration of the trapped energy to the supply through a loop which contains the supply circuit. For this purpose supplementary components are employed which may be auxiliary turn-off thyristors and diodes or transformers likewise associated with diodes. The system illustrated here enables economy to be effected in such supplementary components by employing a loop which is autonomous with respect to the supply for eliminating the trapped energy. The resistor R116 carries out the dissipation of almost the whole of this energy both rapidly and while limiting the current in the dissipation loop, which is added to the charging current passing through the thyristor which is conductive in the half-bridge concerned. Now it is known that the dimensioning of a thyristor is not only a function of the amplitude of the current (I) which it may be caused to pass, but of the time (t) during which it must do it (parameter $I^2t$).

Comparison of the curves R and S in FIG. 6 show clearly the beneficial role of the resistor R116 in the sense not only of a greater speed of recovery but likewise of an economical dimensioning of the thyristors.

Thus it is possible to obtain, thanks to the system described, very high frequencies and very great flexibility of commutation of the thyristors, thanks to the speed of the recovery phase following the extinction phase.

This speed of commutation is very advantageous for systems of the type described in which the regulation of the output voltage is ensured by variation of the times of commutation of the thyristors and as a function of the widths of the positive and negative crenelations of the output voltage which it is desired to create. This speed and this flexibility of commutation are obtained without involving costly and complicated devices, taking into account the magnitude of the currents concerned. The loss of energy in the form of heat resulting from the solution employed is negligible within the context in which these devices operate.

When the diode D112 becomes conductive the current in this diode is subtracted from the current imposed by the induction coil, which rapidly reduces the current supplied by the capacitors. At the instant at which the latter current becomes zero the voltage at the point 76A passes through a minimum −e which corresponds substantially to the drop in voltage Ix . R116 created by the current from the induction coil in the resistor R116.

By the effect of the mutual induction between the two windings of the induction coil L75A, the voltage at the cathode T71 is established at −2e. Hence the thyristor is subjected to a direct voltage E+2e.

If one considers for example, a self-inductance voltage −e of 60 volts one sees that an overvoltage of 120 volts tends to be added to the supply voltage E (about 500 volts) at the terminals of the thyristor T71. It is of interest to reduce this overvoltage in order to employ components of dimensions as restricted as possible. This is obtained by connection of the capacitor C118 in parallel with the resistor R116. This capacitor enables the overvoltage peak which appears at the terminals of this RC circuit to be slightly attenuated.

FIG. 6 represents at P the voltage at the terminals of this circuit when the resistor R116 is present alone and at Q the same quantity in the presence of the capacitor C118. The energy dissipated in the two cases corresponds with the area bounded by the said voltage curve P or Q and the time axis, and these two areas are equal but it may be seen that the voltage peak obtained with the curve Q is substantially lower than that of the curve P.

Returning now to FIG. 1, it may be seen that the junction point 114 between the circuit R116, C118 and the diode D112A is likewise connected to the centrepoints 76B and 76C by way of the diodes D112B and D112C which play strictly the same role as the diode D112A at the time of the commutation into conduction of the thyristors T72 in the bridges 70B and 70C. Each of the bridges 70A, 70B and 70C is intended for feeding one phase respectively of a three-phase network and the signals produced at the respective outputs 14A, 14B and 14C are consequently displaced in phase by 120° with respect to one another under the action of the respective control circuits of the thyristors of these different bridges.

The commutations of the respective half-bridges are displaced in time by a third of a cycle and the corresponding dissipations of the energies trapped in the inductfion coils L75B and L75C in the circuit R116, C118 by way of the respective diodes D112B, D112C occur at moments displaced in time.

Experience has shown that it was possible to employ the same circuit R116, C118 for the three phases without any other cooling accessory than the natural ventilation of the resistor. Such a circuit as that which has just been described may enable, for example, the recovery of the thyristors of each half-bridge to be obtained in 0.4 milliseconds, which for a centralized telecommunication transmission at a typical frequency of 175 HZ corresponds with a ¼ of a cycle.

It will be observed that the dissipation circuit 100 (R106, C108) is associated with the thyristor T71 of each of the bridges 70A, 70B and 70C, the commutations of the thyristors T71 and T72 occuring, it will be recalled, always in phase opposition since in accordance with the technique of extinction by mutual inductance it is the ignition of a thyristor in one arm of the half-bridge which causes the extinction of the other.

The dissipation circuits 120 and 130 are associated respectively with the thyristors T73 and T74 of each of the bridges 70A, B and C.

It is interesting to observe in this respect that the dimensioning of these dissipation circuits may advantageously be different from that of the circuits 100 and 110 which have just been examined. That is, if one refers to the graph of the output current Is in FIG. 5 it may be seen that by the effect of the induction coil L84A in the output circuit 14A, this current is shifted in phase by an angle $\phi$ with respect to the voltage S applied between the centrepoints 76A and 79A. It may be observed in particular that the commutation of the thyristor T71 into the conductive state occurs always for the phase shift being considered, at a time when the instantaneous value $I_{AV}$ of the output current is relatively low whereas it occurs on the contrary at the time of putting the thyristor R74 into the conductive state, at a time when this current is close to its maximum value (see $I_{AR}$ in FIG. 5).

Hence if one keeps to the spirit of the scheme of FIG. 6, the result is that the total current to be interrupted will be less in the first case than in the second and this observation is turned to account consequently for dimensioning the extinction circuits associated with the thyristors T71 and T74 respectively and especially the corresponding dissipation resistors. Thus with the modulator which is represented, the dimensioning of the resistor R106 may be significantly less than that of the resistor R136.

In the same way the dimensioning of the resistor R116 will be less than that of the resistor R126 inasmuch as the phase shift of the current remains substantially constant with respect to the output voltage because of the presence of the induction coils L84. The foregoing observation remains valid within the range of the phase shifts normally employed for the operation of the generator, which enables benefit to be taken of the foregoing observation in the dimensioning of the resistive components.

Hence a modulator constructed in accordance with the principles which have just been explained enables with the aid of an optimum assembly of components of a reasonable cost a very close sequence of commutation of the thyristors which compose it to be obtained.

In particular it is possible to employ thyristors essentially dimensioned for the useful current only, that is to say, which participate in the output signal without making very high currents occur for their commutation proper. Thus it has been possible to check that by means of the arrangements which have just been described, the current passing through a thyristor for causing the extinction of the associated thyristor in the half-bridge is of the same order of magnitude as the useful current passing through this thyristor without there being any need to call upon a considerable overdimensioning.

Apart from these advantageous results upon the plane of the dimensioning and hence of the cost of the thyristors, the circuit enables very rapid commutation of the thyristors both for the production of output wave trains at high frequency and for producing rapid commutations in cases of urgency and reacting rapidly upon the level of the output voltage and/or current as a function of predetermined conditions.

It goes without saying that other emobidments than that which has just been described are possible for putting into effect the principles of the invention as claimed below.

I claim:

1. Apparatus for generating periodic control signals and for injecting these control signals into an electric polyphase power line having N phases, comprising:
    a power supply for supplying a direct current between a first and a second supply terminal;
    means for generating said control signals by controlled commutation of said DC power supply, comprising N bridge circuits, mounted in parallel between the first and second supply terminal, each bridge including two half-bridges and each half-bridge including:
    two loops mounted in series between these supply terminals and connected at a centrepoint of an inductance common to those two loops;
    at least one capacitive element mounted in parallel with each loop, each loop including a component with controlled conduction mounted in series with the inductance and polarized from the first supply terminal towards the second;
    a resistive element associated with each half-bridge mounted between said centrepoint and one of said supply terminals, for dissipating energy stored in said inductance, and a diode, polarized from the second terminal towards the first and connected in series with said resistive element; wherein said components with controlled conduction belonging to the same half-bridge are controlled in phase opposition and wherein the components with controlled conduction belonging to two respective loops of the first and second half-bridges, which are connected to different supply terminals, are controlled with a phase shift in order to generate said periodic control signals; and
    N output circuits for injecting said control signals into said power line, each output circuit being connected between the centrepoints of two of said inductances belonging respectively to a first and second half-bridge of a same bridge, wherein said energy dissipating resistive element is common to at least two of said bridges.

2. A modulator as in claim 1, wherein the loops including the same resistive element are connected to the same supply terminal but belong to two half-bridges connected to different output circuits.

3. A modulator as in claim 1 or 2, wherein a capacitor is mounted in parallel with each said resistive element.

* * * * *